(12) United States Patent
Morris et al.

(10) Patent No.: US 8,301,789 B2
(45) Date of Patent: Oct. 30, 2012

(54) TECHNIQUES FOR PORT HOPPING

(75) Inventors: Cameron Craig Morris, Saratoga Springs, UT (US); Lloyd Leon Burch, Payson, UT (US); David Thomas Robinson, Saratoga Springs, UT (US)

(73) Assignee: EMC Corporation, Hopkinton, MA (US)

( * ) Notice: Subject to any disclaimer, the term of this patent is extended or adjusted under 35 U.S.C. 154(b) by 701 days.

(21) Appl. No.: 11/764,355

(22) Filed: Jun. 18, 2007

(65) Prior Publication Data
US 2008/0313348 A1 Dec. 18, 2008

(51) Int. Cl.
*G06F 15/16* (2006.01)
*G06F 15/173* (2006.01)

(52) U.S. Cl. .......................... 709/230; 709/232; 709/228

(58) Field of Classification Search .................. 709/230, 709/232, 239
See application file for complete search history.

(56) References Cited

U.S. PATENT DOCUMENTS

| | | | |
|---|---|---|---|
| 5,161,192 A * | 11/1992 | Carter et al. ................... | 713/162 |
| 5,657,390 A * | 8/1997 | Elgamal et al. ................ | 713/151 |
| 6,112,241 A * | 8/2000 | Abdelnour et al. ........... | 709/224 |
| 7,027,437 B1 | 4/2006 | Merchant et al. | |
| 7,100,002 B2 | 8/2006 | Shrader et al. | |
| 7,729,273 B2 * | 6/2010 | Knapik et al. ................. | 370/252 |
| 7,729,357 B2 * | 6/2010 | Strater et al. ............... | 370/395.4 |
| 7,860,006 B1 * | 12/2010 | Kashyap et al. .............. | 370/235 |
| 7,937,489 B2 * | 5/2011 | Shizuno ........................ | 709/232 |
| 2002/0016856 A1 | 2/2002 | Tallegas et al. | |
| 2002/0161884 A1 * | 10/2002 | Munger et al. ................ | 709/224 |
| 2003/0200341 A1 | 10/2003 | Lynch et al. | |
| 2005/0169294 A1 * | 8/2005 | Tseng et al. ................... | 370/437 |
| 2005/0220017 A1 * | 10/2005 | Brand et al. ............... | 370/230.1 |
| 2005/0265359 A1 | 12/2005 | Drew et al. | |
| 2007/0070996 A1 | 3/2007 | Oran | |
| 2007/0127502 A1 | 6/2007 | Zhu et al. | |
| 2007/0174472 A1 * | 7/2007 | Kulakowski ................... | 709/229 |
| 2007/0184871 A1 * | 8/2007 | Morita ........................... | 455/522 |

OTHER PUBLICATIONS

"Port and Address Hopping for Active Cyber-Defense", Leyi Shi et al., Pacific Asia Workshop on Intelligence and Security Informatics (PAISI 2007), Apr. 11-12, 2007.*
Lee, H., et al., "Port hopping for resilient networks", *IEEE 60th Vehicular Technology Conference*, 2004. VTC2004-Fall. 2004, vol. 5, (2004), 3291-3295.

* cited by examiner

*Primary Examiner* — Ashok Patel
*Assistant Examiner* — Linglan Edwards
(74) *Attorney, Agent, or Firm* — Barry N. Young

(57) ABSTRACT

Techniques for port hopping are presented. A sender and a receiver engage in a communication session with one another and dynamically switch ports during that communication session. A decision to switch ports is based on a data length or packet count of a given transaction occurring during the communication session. The data length and packet count randomly and dynamically change during the communication session and varies from one transaction to another transaction. Any particular port to switch to during the communication session is also randomly and dynamically generated and varies from one transaction to another transaction.

14 Claims, 6 Drawing Sheets

PORT HOPPING WITH MULTIPLEXING

PORT HOPPING WITH MULTIPLEXING AND SYNTHETIC TRAFFIC

TECHNIQUES FOR PORT HOPPING

COPYRIGHT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the example pseudo source code as described below and in any drawings hereto: Copyright © 2007, Novell, Inc., Provo, Utah—All Rights Reserved.

FIELD

The invention relates generally to network security and more particularly to techniques for port hopping.

BACKGROUND

Externally facing networks receive the most attention from existing security approaches in the industry while internal networks receive little to no attention. This is so because administrators believe the true threat is with external intruders, such that the focus is placed on preventing access to the internal networks and encrypting and authenticating traffic that leaves or enters the internal network.

Two good examples of this are Virtual Private Networks (VPN's) and Secure Socket Layer (SSL) proxies. VPN's and SSL proxies encrypt all traffic external to an internal network (Local Area Network (LAN)) so that external access is secured. Yet, once an attacker (such as an external hacker or even a disgruntled employee of an enterprise) successfully penetrates the internal network (LAN) everything is in the clear and is now easy to attack. Such attacks include passive observation of network traffic to learn user-names, passwords, employee identifiers (ids), or other sensitive information or even active spoofing of World-Wide Web (WWW) resources or identities.

It appears that enterprises believe that access to internal networks are sufficiently secure so as to prevent external hackers in the first instance and that manual procedures are sufficiently robust as to prevent internal abuses from existing employees. This is naïve and unduly exposes enterprises to security breaches that can be catastrophic to those enterprises.

Thus, what is needed is a mechanism, which allows for improved security within internal networks.

SUMMARY

In various embodiments, techniques for port hopping are provided. More specifically, and in an embodiment, a method is presented for facilitating port hopping between a sender and a receiver. First requests for first random numbers are periodically received from a sender and a receiver. In response to the first requests, the first random numbers are supplied to the sender and the receiver. Also, second requests for second random numbers are periodically received from the sender and the receiver, and the second random numbers are supplied to the sender and the receiver. The sender and the receiver use the first random numbers to determine a data length for communications to occur over one or more known communication ports and when the data length is exceeded the sender and the receive switch to different known communications ports to continue communication with one another. Furthermore, the sender and the receiver use the second random numbers to determine the known communication ports.

DETAILED DESCRIPTION

Figure 1:
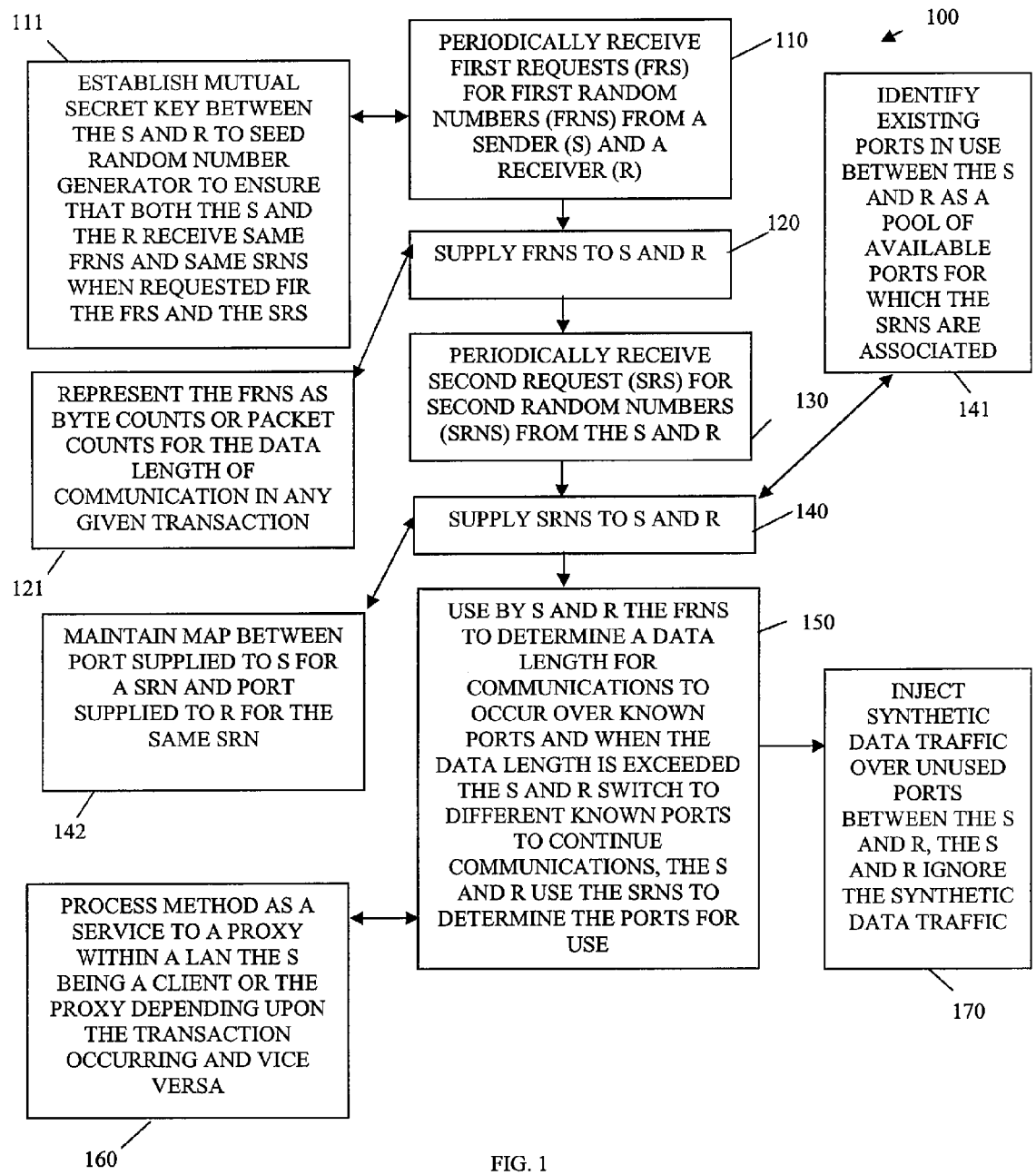
FIG. 1 is a diagram of a method for facilitating port hopping between a sender and a receiver, according to an example embodiment.

A "resource" includes a user, content, a processing device, a client, a server, a proxy, a node, a service, an application, a system, a principal, a directory, a data store, groups of users, combinations of these things, etc.

A "client" is a type of resource that engages in a communication session with one or more other resources for purposes of gaining access to those resources, such as acquiring access to content. The resources may be within a local environment of client or within an external environment remote from the local environment of the client.

A "server" is another type of resource that engages in communication sessions with clients or other servers or resources.

Clients are connected to local servers via a Local Area Network (LAN) configuration. Clients may also connect to other external servers over a Wide Area Network (WAN, such as the Internet) via LAN proxies.

A Proxy is yet another type of resource that may be viewed as a server. A proxy may be transparent, which means that the clients in which the proxy services are not preconfigured or aware of the existence of the transparent proxy. A proxy may also be a forward proxy; a forward proxy means the clients are aware of and are preconfigured to interact with the forward proxy. Finally, a proxy may also service a server or even groups of clients as a reverse proxy, which means that traffic coming into the LAN over the WAN is first processed by the reverse proxy before being routed to the LAN clients or LAN servers. A proxy may also interact with other proxies, some within the LAN or some over the WAN.

A LAN includes a plurality of clients and at least one proxy or server that services those clients. The LAN is secure, and the proxy of the LAN provides security to resources located outside the LAN over an insecure WAN connection, such as the Internet. Communications occurring between LAN resources and the WAN resources may be made secure using techniques, such as Virtual Private Networks (VPN's), Secure Socket Layer (SSL) protocols, or other encrypted communication techniques. Generally, communication occurring within the LAN is not encrypted, since this adds a layer of processing not typically necessary for an already fairly secure environment.

In an embodiment, the processing described herein is used within a LAN environment between clients and proxies/LAN servers where encryption is not being used. The clients reside on machines that are separate and distinct from the proxies, such an arrangement may be viewed as a client-server architecture.

The terms "sender" and "receiver" are relative. This means that during any given LAN transaction between a client and a proxy/server the client may be designated as the sender for that transaction or the receiver and vice versa. So, in a transaction the resource transmitting information is designated as the sender and the resource receiving information is designated as the receiver. A communication session between a client and a proxy can include a plurality of transactions and the designation as to who are the sender and receiver can change with each transaction.

A "communication port" refers to a logical network destination associated with an application on a machine, and many ports can exist on one physical network destination. Each port may be reserved or designated for different types of network traffic.

Generally, port numbers appear in network packets and these port numbers map to specific processes or resources on the receiving machine that can handle or that are expecting those network packets. A network packet's header may include both a source (originating or sender) port number and a destination (receiver or recipient) port number. Some resources are preconfigured to listen on only certain predefined port numbers and ignore traffic associated with other port numbers.

Typical network protocols that heavily rely on port numbers to map to resources include Transmission Control Protocol (TCP) and User Datagram Protocol (UDP). These protocols are central to processing associated with traditional Internet traffic.

Various embodiments of this invention can be implemented in existing network architectures, security systems, data centers, and/or communication devices. For example, in some embodiments, the techniques presented herein are implemented in whole or in part in the Novell® proxy server products, operating system products, data center products, and/or directory services products distributed by Novell®, Inc., of Provo, Utah.

Of course, the embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

It is within this context, that various embodiments of the invention are now presented with reference to the FIGS. 1-8.

FIG. 1 is a diagram of a method 100 for facilitating port hopping between a sender and a receiver, according to an example embodiment. The method 100 (hereinafter "port hopping facilitator service") is implemented as instructions in a machine-accessible and readable medium. The instructions when executed by a machine perform the processing depicted in FIG. 1. The port hopping facilitator service is also operational over and processes within a network, such as a LAN network configuration. The network may be wired, wireless, or a combination of wired and wireless.

Initially, a principal (user or automated application) is engaged in secure communications over a WAN with another external principal (another user or another automated application). This communication occurs via a LAN proxy and perhaps a World-Wide Web (WWW) server on behalf of the two principals. The LAN proxy is and the WWW server are externally facing network services and communicate using a VPN or other SSL protocols with one another.

The communication occurring between the LAN principal and the LAN proxy is the subject of the techniques discussed herein with the port hopping facilitator service. Typically, little to no security would be used in these communications since the LAN is secure and within a firewall environment. However, if the LAN is penetrated by a hacker or even surreptitiously compromised by an authorized principal of the LAN, then additional security is particularly useful and as will be seen herein, the additional security does not require encrypted communications between the principal and the LAN proxy.

The principal uses a client machine within the LAN and the LAN proxy can be implemented as a LAN server or within a LAN server. The LAN proxy may be configured as a forward, transparent, or even reverse proxy with respect to the principal. When the principal and proxy engage in a communication session a number of transactions occur during that session, the party sending information during a transaction is the sender and the party receiving that information is the receiver. Thus, the designation of sender and receiver between the client and the proxy changes during the session depending upon who is actively sending information and who is actively receiving information.

With this context the processing of the port hopping facilitator service is now discussed with reference to the FIG. 1.

At 110, the port hopping facilitator service periodically receives first requests for first random numbers from a sender and a receiver engaged in a communication session with one another.

In an embodiment, at 111, prior to receiving the first requests, the port hopping facilitator service assists the sender and receiver in establishing a mutually secret key between one another. This mutually secret key is used to seed a random number generator during the communication session to ensure that same first random numbers and same second random numbers, discussed below. The shared key establishment can be established via a variety of mechanisms, such as via a Diffie-Hellman key exchange process, etc. The seeding via the shared key assures that both the sender and receiver acquire the same random numbers when requested from the random number generator.

At 120, the port hopping facilitator service supplies the first random numbers to the sender and the receiver as they are requested from the parties during their communication session with one another.

At 121, the port hopping facilitator service represents the first random numbers as either byte length or packet count. In other words, the first random number is known to the sender and the receiver to be the number of bytes or data length for a current transaction during the session for which a same current communication port is to be used or the packet count for the which a same current communication port is to be used. Once a byte count or packet count is reached in a given transaction between the sender and receiver during the session, the sender and receiver each issue a new first request for another byte count or packet count and engage in a different transaction using a different communication port, which is identified via the second random numbers (discussed below).

So, the first random numbers identify a condition upon which a different communication port is to be used or switched to during the session between the sender and receiver. This condition is not time based, which is traditionally the case. Thus, it does not suffer from time-based port hoping issues that usually require very detailed device clock synchronization to be useful because even well synchronized servers can be off by a few milliseconds and render port hopping communication ineffective. Here, the port hopping facilitator service uses port hoping based on data length, such as byte count or packet count. The data length is represented via the first random numbers and these are regularly and periodically changing during the session as the data length condition is met and as the sender and receiver continue to communicate in the session and request new data lengths via the first requests for the first random numbers.

At 130, the port hopping facilitator service periodically receives second requests from the sender and the receiver during the communication session for second random numbers. The second random numbers are associated with port numbers or identifiers for the sender and receiver to use with a given transaction having a given data length condition that was identified via a particular first random number.

So, for any given transaction during the communication session there is a pair consisting of a first random number and a second random number. The first random number identifies the data length via packet count or byte count for the transaction and the second random number identifies the port for transmitting and receiving the data or information associated with the transaction. Once the data length is reached a new pair of first and second random numbers is acquired and a new transaction commences using that new data length identified in the new first random number and transmitting and receiving information for the new transaction over a new port identified in the new second random number.

At 140, the port hopping facilitator service supplies the second random numbers to the sender and receiver when requested. Again, the second random numbers are associated with or map to specific communication ports for the communication session to occur over.

According to an embodiment, at 141, the port hopping facilitator service identifies existing ports that are actively in use between the receiver and the sender and uses these active ports as a pool of available ports from which to select from when mapping or associating the second random numbers to the ports.

In an embodiment, at 142, the port hopping facilitator service maintains a map between a particular port supplied with a particular second random number to the sender with a different port supplied with the particular second random number to the receiver. In other words, any given second random number may map to a unique pair of ports, where one is supplied to the sender and one is supplied to the receiver. In effect, the ports are multiplexed. This can be implemented at the TCP stack level using packet counts or numbers as data length conditions. Additionally, the ports may be multiplexed while transmitted over the LAN network between the sender and the receiver but each the sender and the receiver may use the same port number at the sending and receiving end of the transaction; so, while on the LAN wire (can also be wireless) the packet is being multiplexed to confuse potential eavesdroppers.

At 150, the sender and the receiver use the first random numbers to determine a data length for any given transaction of the communication session occurring between the sender and the receiver. This occurs over known ports identified by the second random numbers. When the data length is exceeded, the sender and the receiver switch to different known ports to continue communicating with one another; again the second random numbers identify the known and different known ports for the transactions of the session and the data length determines when the sender and the receiver switch to different communication ports.

According to an embodiment, at 160, the entire method 100 represented as the port hopping facilitator service may be processed as a service to a proxy within a LAN. The sender is a client or the proxy depending upon who is sending and receiving for any given communication transaction during a communication session. Similarly, the receiver is the client or the proxy.

In an embodiment, at 170, security can be further enhanced in the communications between the sender and the receiver by the port hopping facilitator service injecting synthetic data traffic over unused ports between the sender and the receiver. The sender and the receiver ignore the synthetic data traffic and let it fall into a trash can or other mechanism. The synthetic data traffic can be injected over ports that the sender and receiver typically use but at any given time the two ports that the sender and receiver are actively using for legitimate communications do not have the synthetic data traffic. This makes it even more difficult for an internal eavesdropper to detect where legitimate communications are occurring. Furthermore, since the port hopping is being used as described above and below, the eavesdropper cannot decipher what is actually transpiring between the sender and the receiver even if traffic is intercepted.

An example piece of pseudo code for achieving some of the processing discussed above for the port hopping facilitator service may be implemented as follows:

```
byteCount = 0
for each byte to send do:
    if (byteCount == timeToHop)
        byteCount = 0;
        timeToHop = getNextPortHop(
        randomGenerator.next( ))
        currentPort = getNextPort( randomGenerator.next( ))
    send( byte, currentPort )
```

© 2007 Novell, Inc., Provo, Utah

It is now apparent how internal and unencrypted communications over a network, such as a secure LAN, can be made more secure. This is done via port hopping. However, unlike traditional approaches the port hopping that is used is based on data length and is not temporal based. Moreover, the data length and the ports are identified via a commonly seeded random generation technique known to just the sender and the receiver.

Figure 2:
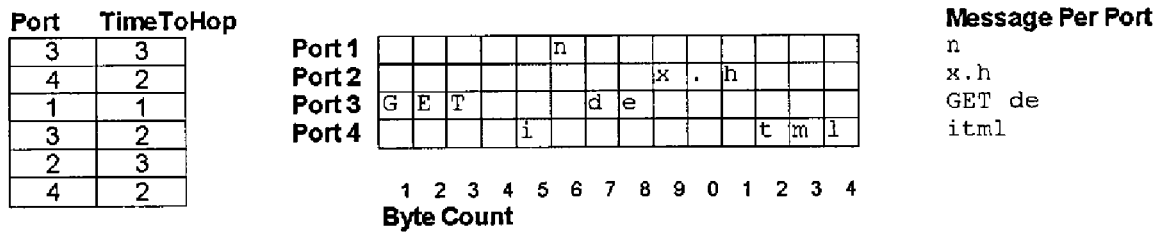
FIG. 2 is a diagram illustrating example actions taken by the method depicted in the FIG. 1, according to an example illustration.

FIG. 2 is a diagram illustrating example actions taken by the method 100 depicted in the FIG. 1, according to an example illustration. FIG. 2 is one example to illustrate how the processing of the port hopping facilitator service proceeds for a communication session between a second and a receiver where the sender is requesting a World-Wide Web (WWW) page identified as "index.html."

In the example, there are 4 active ports being used between the sender and the receiver. In this example, the sender may be viewed as a client having a WWW browser that a user is interacting with. The user activates a link or types in a request to retrieve the "index.html" WWW page. At a lower level within the browser this is translated into perhaps a File Transfer Protocol (FTP) request of "Get index.html." The "index.html" page can exist external to a LAN in which the user is processing.

The request is intercepted (transparent proxy) or forwarded (forward proxy) to a proxy within the user's LAN; however the entire request is broken down into a series of 6 separate transactions. So, the client on behalf of the user communicates the full request "GET index.html" in a session between the client (initially the sender) and the proxy (initially the receiver) in 6 separate transactions. This occurs in the following manner.

The sender (client) initially acquires a first random number as does the receiver (proxy), which translates to 3 and represents a data length of 3. The two (client and proxy) also acquire a first second random number that maps to port number 3. The first transactions commences as follows: the sender takes the first 3 bytes defined from the first random number and sends them to the receiver over port 3. Next, a new value for the first random number is acquired for the second transactions, since the full request "GET index.html" has not yet been sent from the client to the proxy, and the new first random number is identified as a data length of 2. Also a new second random number identifies a port 4 to use for the second transaction. In response, the client sends "i" to the proxy over port 4; note that there are two characters sent as a space proceeds the "i." The example continues for four more transactions until the proxy has the complete request of "GET index.html." At this point the proxy makes a request perhaps via SSL or a VPN to an external site for the "index.html" page, the data returned over the SSL or VPN can then be intercepted via the proxy (reverse proxy configuration) and sent back to the client via the same technique (results of the page returned not shown in FIG. 2).

The table having two columns labeled as "Port" and "TimeToHop" is shown on the left hand side of the FIG. 2. The Port column values represent values of second random numbers acquired by both the client and the proxy and the TimeToHop column values represent values of first random numbers also acquired by both the client and the proxy. Visualization of what is transmitted and the 6 transactions for the example communication session is shown in the center diagram having Ports 1-4 labeled along a y axis and byte counts (data length) labeled as 1-9 and 0-4 with zero being 10 and the numbers following 0 being 11-14 but labeled as 1-4. The table to the far right shows what was ultimately transmitted for each port during the communication session.

The processing to make this happen was described above with reference to the port hopping facilitator service. This processing works great at the application level. Moreover, software development kits (SDK's) can hide the details of this multiple port hopping, such that the user of the client is entirely unaware of what is going on and believes just a single port is in use between the client and the proxy. The user may even be unaware of the proxy (transparent and/or reverse proxy configuration). So, users or programs developed by the users do not have to even know the details of the port hopping.

It is noted that although the table to the left includes a column header having the word "time" that this is not intended to indicate a temporal-based condition; rather, it is meant to identify "when" port hoping is to take place and the condition is based on byte count not time.

Figure 3:
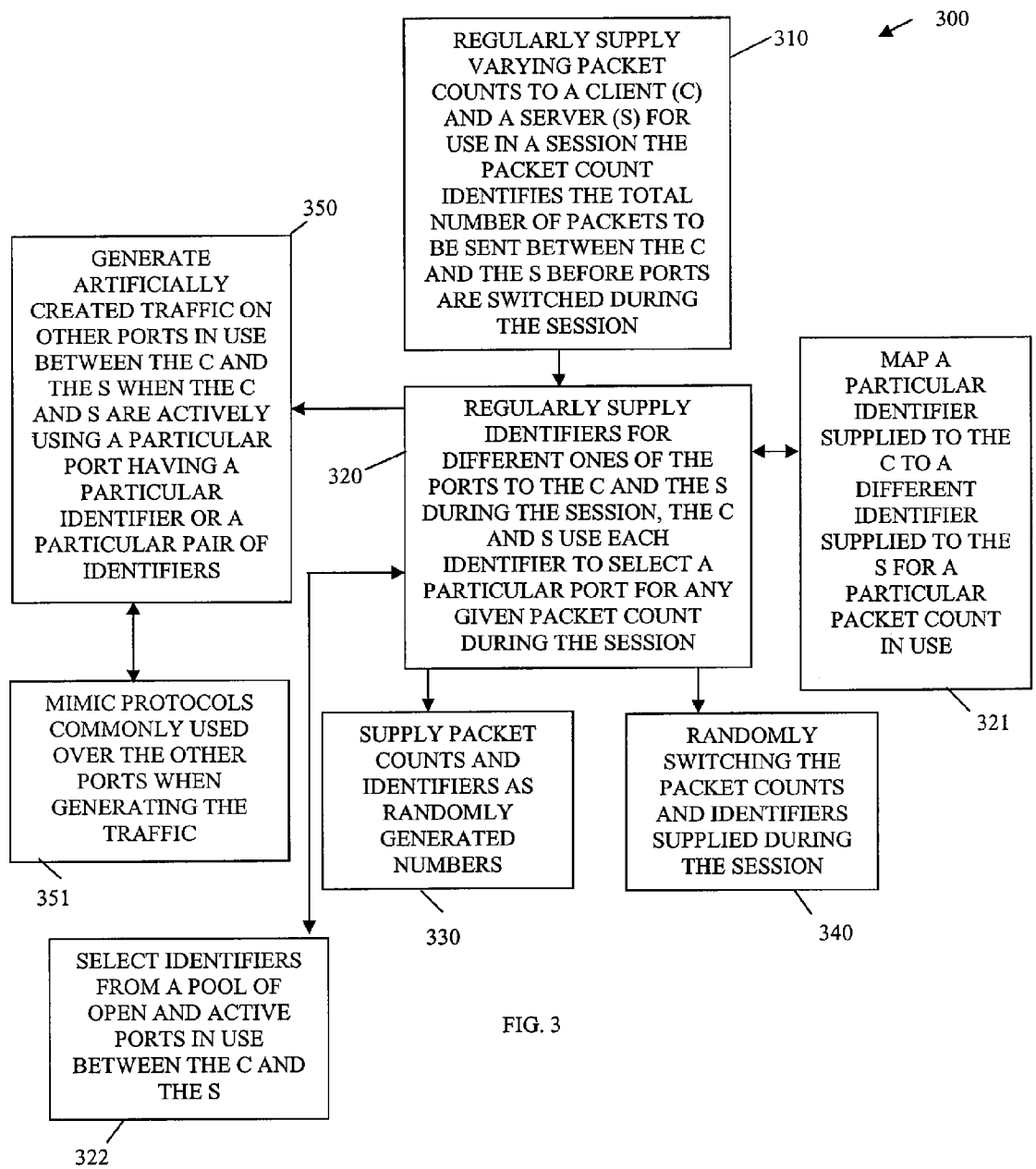
FIG. 3 is a diagram of a method for facilitating port hopping between a client and a server, according to an example embodiment.

FIG. 3 is a diagram of a method 300 for facilitating port hopping between a client and a server, according to an example embodiment. The method 300 (hereinafter "client-server port hopping service" is implemented in a machine-accessible and readable medium as instructions. The instructions when executed by a machine perform the processing depicted in the FIG. 3. Moreover, the client-server port hopping service is operational over a network, such as a LAN or firewall network environment. The network may be wired, wireless, or a combination of wired and wireless. The processing associated with the client-server port hopping service presents an alternative perspective and in some cases enhanced perspective to the processing associated with the port hopping facilitation service described above with the method 100 and within the context of the FIG. 1.

The method 100 of FIG. 1 was described in terms of a sender and a receiver engaged in a communication session. The communication session was broken into a series of transactions between the sender and the receiver. Who was designated as the sender and who was designated as the receiver changed during the session based on who was sending and who was receiving for any given transaction. The client-server port hopping service of the FIG. 3 is described in terms of a client and server interacting with one another in a similar session having a series of sub transactions.

At 310, the client-server port hopping service regularly supplies varying packet counts to a client and a server for use in a session. The packet count identifies a total number of packets to be sent between the client and the server before a current port in use between the two is switched to a different communication port. One technique for identifying the packet counts was described above with respect to the method 100, where both the client and the server are synchronized to receive a same first random number.

At 320, the client-server port hopping service also regularly supplies identifiers for different ones of the ports to the client and the server during the communication session. The client and the server each are configured to use each identifier to select a particular communication port for communication with each other during any particular point in time during the communication session for a particular packet count. Again, the method 100 identified a technique where this can be achieved, such as by providing a same second random number to both the client and the server; the second random number identifying the particular port for both the client and the server to use for a given packet count.

In an embodiment, at 321, the client-server port hopping service also maps a particular identifier supplied to the client to a different identifier supplied to the server for a particular packet count and a particular transaction during the session. The client-server port hopping service makes sure, perhaps via TCP-level port multiplexing that the information sent from the client over a first port is received properly at the second port known to the server. So, the ports can be mapped and multiplexed for added security.

According to an embodiment, at 322, the client-server port hopping service selects the identifiers from a pool of open and active ports in use between the client and the server. So, the client-server port hopping service may restrict the pool of available ports to just ports that are in use between the client and server. This further hides and obfuscates communications between the client and the server from potential eavesdroppers because only ports regularly in use are used for the active port hopping; so, there is no use of an anomalous port that might alert an eavesdropper to what is going on between the client and the server.

In some cases, at 330, the client-server port hopping service supplies the packet counts and the identifiers as randomly generated numbers to both the client and the server. Again, the details of this were described in detail above with reference to the method 100 of the FIG. 1. Additionally, at 340, the packet counts and the identifiers can be regularly and randomly switched during the session.

Still further, at 350, the client-server port hopping service generates artificially created traffic on other ports that are active and in use between the client and server when the client and server are both actively using a particular port for a particular packet count transaction. So, when the client and server are engaged in a transaction during the session for a particular packet count and port identifier, the client-server port hopping service produces and injects artificial traffic over the other unused ports to dupe or confuse any would be eavesdroppers. At 351, the client-server port hopping service can also mimic protocols over those unused ports for the injected artificial traffic that are typically used over those unused ports. So, if one unused port uses Hypertext Transfer Protocol (HTTP), the client-server port hopping service uses HTTP when injecting the artificial traffic over that port. Again, the client and the server ignore the artificially generated traffic and send it to a trash can.

An example algorithm to achieve the client-server port hopping service is as follows:

```
Given a packet and a port to send it on:
    packetCount = 0
    for each packet to send do:
        if(packetCount == timeToHop)
            packetCount = 0;
            timeToHop = getNextPortHop(
            randomGenerator.next( ))
            portMap = getNextPortMap
            (randomGenerator.next( ))
        currentPort = portMap.getPort(port)
        send( packet, currentPort )
```

© 2007 Novell, Inc., Provo, Utah

Figure 4:
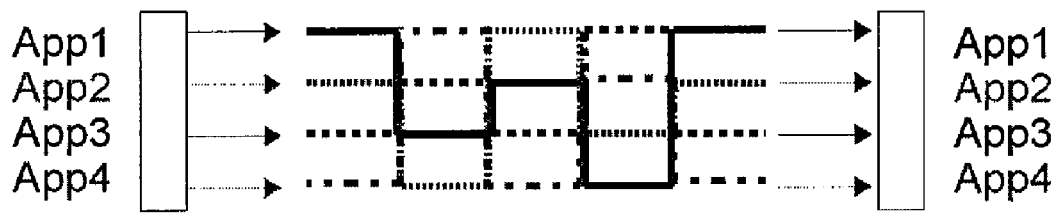
FIG. 4 is a diagram illustrating example multiplexing of ports between a client and a server that the method of the FIG. 3 performs, according to an example illustration.

FIG. 4 is a diagram illustrating example multiplexing of ports between a client and a server that the method 300 of the FIG. 3 performs, according to an example illustration. Again, the FIG. 4 is presented to demonstrate example multiplexing of ports during the port hoping techniques presented herein. This was discussed above with reference to the methods 100 and 300 of the FIGS. 1 and 3, respectively.

In the FIG. 4, the packets transmitted between senders and receivers (identified as Apps 1-4) are port multiplexed, perhaps at the TCP stack level of communication while those packets are in route between the senders and the receivers. So, instead of allocating a set of ports to hop through for each application; hopping can occur through ports already in use. Thus, all active ports (4 n the example) can be hopped through at once or at the same time.

An eavesdropper would not know in which order the packets are jumping or even when they are in fact jumping. The additional amount of obfuscated information would make it increasingly more difficult to decipher on the part of the eavesdropper.

Figure 5:
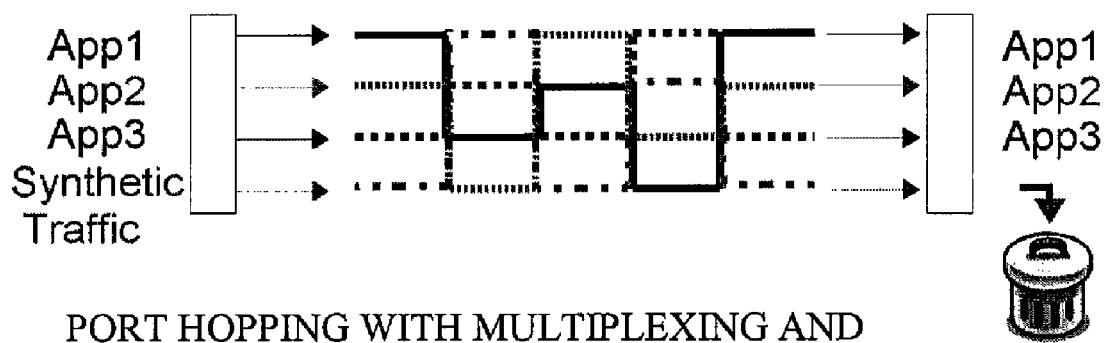
FIG. 5 is a diagram illustrating example random data injection between a client and a server that the method of the FIG. 3 performs, according to an example illustration.

FIG. 5 is a diagram illustrating example random data injection between a client and a server that the method 300 of the FIG. 3 performs, according to an example illustration. The FIG. 5 is an example graphical illustration of synthetic data injection over unused and yet active ports between a sender and a receiver with multiplexing. Here, there is no App 4; rather synthetic traffic is injected, multiplexed, and then discarded at the receiver's side of the transaction into a trash can.

Figure 6:
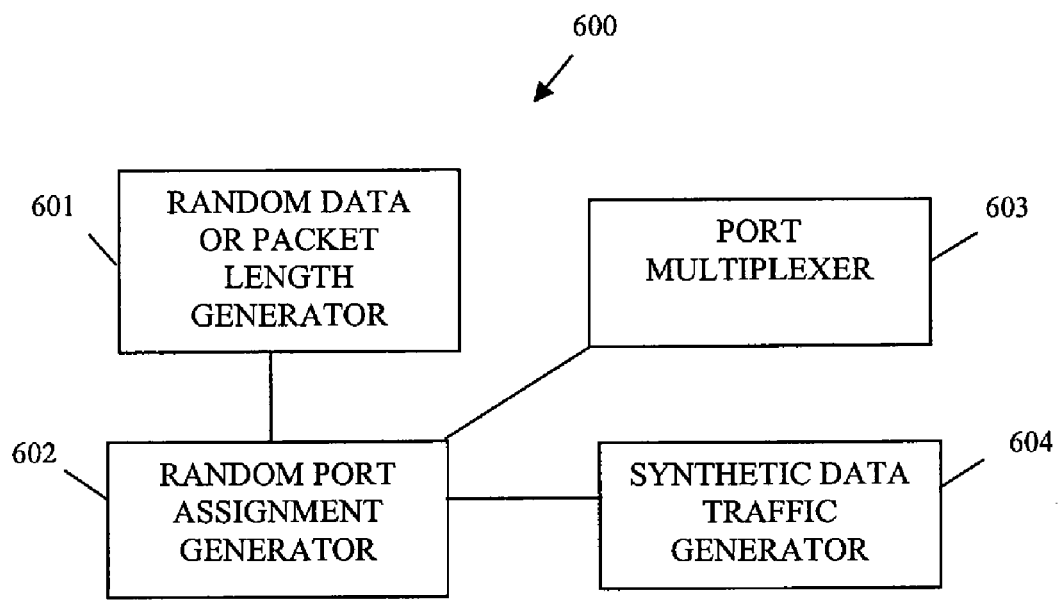
FIG. 6 is a diagram of a port hopping system, according to an example embodiment.

FIG. 6 is a diagram of a port hopping system 600, according to an example embodiment. The port hopping system 600 is implemented as instructions on or within a machine-accessible and readable medium. The instructions when executed by one or more machines perform processing depicted with respect to the methods 100 and 300 of the FIGS. 1 and 3, respectively. The port hopping system 600 is also operational over a network and the network may be wired, wireless, or a combination of wired and wireless. In some cases the network is the LAN or a firewall network environment.

The port hopping system 600 includes a random data or packet length generator 601 and a random port assignment generator 602. In some cases, the port hopping system 600 may also include a port multiplexer 603 and/or a synthetic data traffic generator 604. Each of these will now be discussed in turn.

The random data or packet length generator 601 is implemented in a machine-accessible and readable medium and is to process on a machine over a network connection, such as LAN connection. The random data or packet length generator 601 and its processing were described in detail above with reference to the methods 100 and 300 of the FIGS. 1 and 3, respectively.

The random data or packet length generator 601 is to dynamically and regularly supply random data lengths or random packet counts to senders and receivers engaged in communication sessions with one another. The senders and receivers engage in sessions by using particular communication ports that are identified by the random port assignment generator 602 (discussed below). The session includes a series of sub transactions, each sub transaction or any given transaction occurs for the data length or packet count that is supplied via the random data or packet length generator 601 to the sender and the receiver during the communication session.

The random port assignment generator 602 is implemented in a machine-accessible and readable medium and is to process on the machine or a different machine entirely. Example processing associated with the random port assignment generator 602 was described in detail above with reference to the methods 100 and 300 of the FIGS. 1 and 3, respectively.

The random port assignment generator 602 dynamically and regularly supplies port identifiers for particular communication ports that the senders and receivers are to use for a given data length or packet count during a given transaction of the session.

According to an embodiment, the communication sessions between the senders and receivers occurs within a firewall environment or a protected LAN and the senders and receivers are clients and servers, the servers service the clients for access to an externally facing WAN, such as the Internet. Moreover, at least one receiver or sender may be a proxy, such as a reverse and/or transparent proxy, such that the client is unaware of the existence or activity of the proxy.

According to an embodiment, the port hopping system 600 also includes a port multiplexer 603. The port multiplexer 603 is implemented within a machine-accessible and readable medium and is process on the machine or the different machine.

The port multiplexer 603 maps any given port supplied to any given sender at any particular point during a particular communication session to a different port supplied to a particular receiver interacting with the given sender. It may also be the case that as a transaction for a given data length or packet count traverses over the network to the receiver it hops from port to port and arrives on a common port of the receiver that the sender initially sent from. This was described in detail above with reference to the methods 100 and 300 of the FIGS. 1 and 3, respectively and with respect to the FIG. 4.

In another case, the port hopping system 600 includes a synthetic data traffic generator 604. The synthetic data traffic generator 604 is implemented within a machine-accessible and readable medium and is process on the machine or the different machine.

The port hopping system 600 supplies artificial network traffic over unused ports during the communication sessions.

This was described in detail above with reference to the methods 100 and 300 of the FIGS. 1 and 3, respectively and with respect to the FIG. 5.

Figure 7:
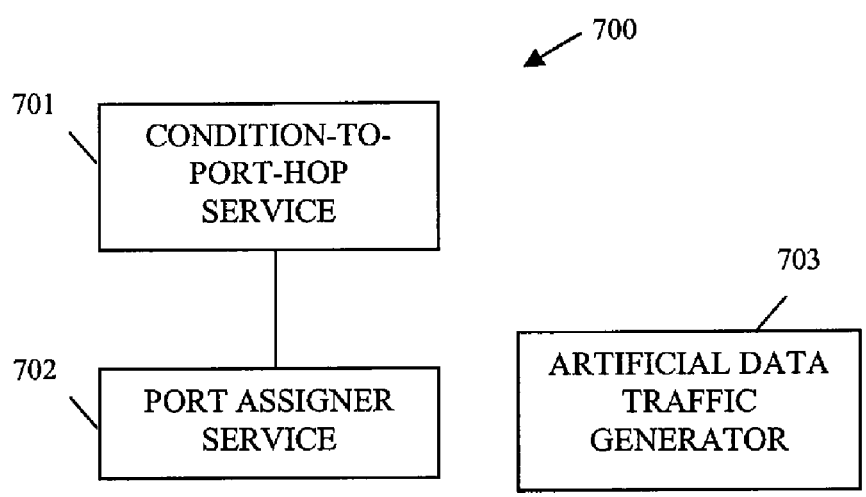
FIG. 7 is a diagram of another port hopping system, according to an example embodiment.

FIG. 7 is a diagram of another port hopping system 700, according to an example embodiment. The port hopping system 700 is implemented as instructions on or within a machine-accessible and readable medium. The instructions when executed by a machine also perform, among other things; the processing depicted with respect to the methods 100 and 300 of the FIGS. 1 and 3, respectively. The port hopping system 700 is also operational over a network and the network may be wired, wireless, or a combination of wired and wireless. The port hopping system 700 presents a different perspective to the port hopping system 600 described above with reference to the FIG. 6.

The port hopping system 700 includes a condition-to-port-hop service 701 and a port assigner service 702. In some cases, the port hopping system 700 also includes an artificial data traffic generator 703. Each of these will now be discussed in turn.

The condition-to-port-hop service 701 is implemented in machine-accessible and readable medium and is to process on a machine. Example usages of the condition-to-port-hop service 701 were described above with reference to the methods 100 and 300 and the system 600 of the FIGS. 1, 3, and 6, respectively.

The condition-to-port-hop service 701 produces conditions that instruct a client and proxy on when they should switch ports when communication with one another during a communication session. The conditions supplied (dynamically and in real time) are based on packet count or byte count and are not temporal based. So, the condition-to-port-hop service 701 supplies time-independent conditions to a client and a proxy.

The port assigner service 702 is implemented in a machine-accessible and readable medium and is to process on the machine or a different machine entirely. Example processing associated with the port assigner service 702 has been described in detail above with reference to the FIGS. 1, 3, and 6.

The port assigner service 702 supplies (dynamically and in real time) particular communication ports that the client and the proxy are to use during any particular point (particular sub transaction) during the communication session.

In an embodiment, the port assigner service 702 supplies a same port identifier to both the client and the proxy at any particular point or during any particular transaction of the communication session occurring between the client and the server.

According to another embodiment, the port assigner service 702 multiplexes a particular pair of communications ports at any particular point during the communication session. So, the client can use a first communication port and the server can use a second communication port and the first and second communication ports are mapped or associated with one another. It may also be the case that the multiplexing occurs when a particular transaction of information traverses the network from a sender (client or server) to a receiver (client or server) but the port used by the client is the same port number as what the receiver uses.

In some cases, the port assigner service 702 selects the communication ports for use between the client and the server in response to active ports in use between the client and the server. So, a selection of ports is based on a pool of available or active ports; rather than from all ports available between the client and the server.

According to an embodiment, the port hopping system 700 also includes an artificial data traffic generator 703. The artificial data traffic generator 703 is implemented in a machine-accessible and readable medium and is to process on the machine or the different machine.

The artificial data traffic generator 703 injects synthetic traffic over unused ones of the communication ports during the communication session. Examples of this were described in detail above with reference to the methods 100 and 300 of the FIGS. 1 and 3, the FIG. 5, and the system 600 of the FIG. 6.

Figure 8:
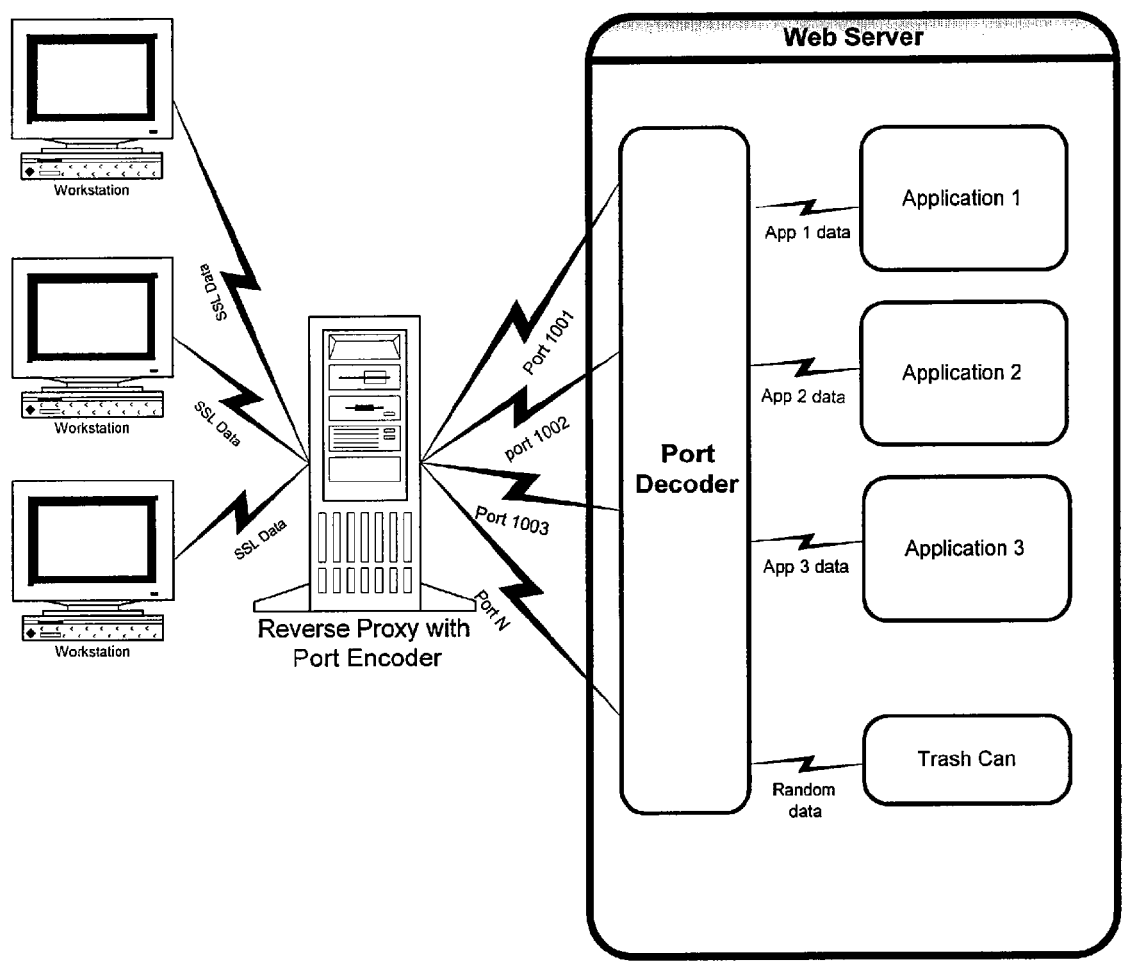
FIG. 8 is an example architectural arrangement for achieving port hopping, according to an example illustration.

FIG. 8 is an example architectural arrangement for achieving port hopping, according to an example illustration. It is understood that the architecture shown in the FIG. 8 is presented from purposes of illustration and comprehension only as other arrangements are foreseeable with the teachings presented herein. So, components depicted may be re-arranged, removed, or subsumed in other implementations of this invention without detracting from the beneficial teachings provided herein.

The workstations may be viewed as clients or as senders and receivers and the LAN web server to the workstations may also be senders or receivers. The workstations communicate with LAN or firewall protected network services labeled as applications 1-3. Communications occur via SSL between the workstations and a reverse proxy with port encoding. The reverse proxy and the port decoder combine to implement the techniques presented herein and above, such that as the workstations and the applications communicate within the LAN the communications port hop based on data length or packet count conditions. Synthetic data may also be injected in which case that traffic is ignored and sent to a trash can. Port multiplexing may also be used as transactions occur between the workstations and the applications.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
    assisting a sender and a receiver in establishing between the sender and the receiver a mutually secret key that is used to seed random number generators used by the sender and the receiver so that both the sender and the receiver have the same first random numbers and same second random numbers, the mutually secret key established via a Diffie-Hellman key exchange process between the sender and the receiver;

periodically receiving first requests for the first random numbers from the sender and the receiver and supplying the first random numbers to the sender and the receiver;

periodically receiving second requests for the second random numbers from the sender and the receiver and supplying the second random numbers to the sender and the receiver;

using, by the sender and the receiver, the first random numbers to determine conditions that are not time based for communications to occur over one or more communication ports, the second random numbers identify specific ones of the communication ports based on specific conditions defined by specific first random numbers and the first random numbers identify the conditions that represent values for the data length of communications as byte lengths for data packets used during the session and when the data length for a particular communication is exceeded the sender and the receiver switch to different one of the communications ports identified by a specific second random number to continue a session with one another, the different one of the communications ports uses different byte lengths from a previous communication over a previous communication port during the session, and all communications between the sender and the receiver during the session occur over a local area connection (LAN) and are unencrypted; and injecting synthetic traffic on non-active ports of the sender and receiver that the sender and receiver ignore during the session, the session occurring over the LAN, said synthetic traffic being generated by mimicking protocols commonly used over the other communication ports.

2. The method of claim 1 further comprising, processing the method as a service to a proxy and a client, the proxy and the client communicate within the local area network with one another over the communication ports and wherein depending upon a particular transaction between the proxy and the client, the proxy is the sender or the receiver and conversely the client is the receiver or the sender.

3. The method of claim 1 further comprising, identifying existing communication ports in use between the sender and the receiver as a pool of available communication ports for which the second random numbers are associated.

4. A method, comprising:

regularly supplying varying packet counts to a client and a server for use during a communication session between the client and the server, each packet count identifies a total number of packets to be sent between the client and the server before communication ports are switched during the session, each packet count communicated to the client and the server via a specific first random number and the communication session occurring over a local area network (LAN) and all communication is unencrypted during the session between the client and the server;

regularly supplying identifiers for different ones of the communication ports as specific second random numbers to the client connection and the server during the communication session, the client and the server use each identifier to select a particular communication port for communications for any given packet count during the session, each identifier communicated as one of the specific second random number and each identifier mapped to a specific packet count, specific first random number and the specific second random number obtained by the client and server supplying a same seed value to a random number generator and the same seed value is a mutual secret key jointly established between the client and the server before the specific first and second random numbers are obtained by the client and the server;

randomly switching the packet counts and the identifiers supplied during the session between the client and the server; and injecting synthetic data on non-active ports of the client and the server during the session that the client and the server ignore, said synthetic traffic being generated by mimicking protocols commonly used over the other communication ports.

5. The method of claim 4 further comprising, mapping a particular identifier supplied for a particular packet count to the client to a different identifier supplied to the server for that particular packet count.

6. The method of claim 4 further comprising, selecting the identifiers from a pool of open and active ports in use between the client and the server.

7. A system, comprising:

a machine configured having a random data or packet length generator implemented in a non-transitory computer-readable medium and to process on the machine; and the machine or a different machine having a random port assignment generator implemented within a non-transitory computer-readable medium and to process on the machine or the different machine, the random data or packet length generator is to dynamically and regularly supply random data lengths as byte lengths to senders and receivers engaged in communication sessions with one another as first random numbers, the senders and receivers engage in the sessions by using particular communication ports that are identified by the random port assignment generator as specific second random numbers for given transactions of the sessions, each session having a plurality of transactions and each transaction occurring over a different one of the communication ports and communication over each transaction is unencrypted traffic on a local area network (LAN), the communication ports identified as the specific second random numbers by the random port assignment generator, and each transaction occurring for a particular byte length before the senders and receivers switch to a different communication port for a different transaction using a different byte length, each byte length corresponds to a particular first random number and each first random number corresponds to a specific second random number that is used to identify a specific communication port, the senders and the receivers establish a mutual secret between one another and use the mutual secret as a seed value to the random data or packet length generator and the random port assignment generator so that the senders and the receivers obtain the same values for the first random numbers and the second random numbers, and during any specific session synthetic data is generated on non active ports for that specific session that a specific sender and a specific receiver ignore, said synthetic traffic being generated by mimicking protocols commonly used over the other communication ports.

8. The system of claim 7, wherein at least one sender or receiver is a proxy implemented within the local area network (LAN) and at least one sender or receiver is a client configured within the LAN.

9. The system of claim 7 further comprising, a port multiplexer implemented in a machine-accessible medium and to process on the machine or the different machine, wherein the port multiplexer maps any given port supplied to any given sender at a particular point during a particular communication session to a different port supplied to a particular receiver.

10. The system of claim 7, wherein the communication sessions occur between the senders and receivers within a firewall network environment.

11. A system, comprising:
a machine having a condition-to-port-hop service implemented in a non-transitory computer-readable medium and to process on the machine; and
the machine or a different machine having a port assigner service implemented in a non-transitory computer-readable medium and to process on the machine or the different machine, the condition-to-port-hop supplies time-independent conditions as first random numbers to a client and to a proxy for the client and proxy to use during a communication session over a local area network (LAN) where communications over the LAN are unencrypted and the first random numbers are used by the client and the proxy to decide when to switch communication ports during the session, the random numbers used to identify byte lengths for each transaction of the communication session and when a particular byte length is reached a different transaction for the communication session initiated over a different port, and the port assigner service supplies particular communication ports as second random numbers that the client and the proxy are to use during any particular point during the communication session, each first random number maps to a specific second random number, the client and proxy establish a mutual secret with one another that is used as a seed value to obtain the first random numbers and the second random numbers, and synthetic traffic is generated on non-active ports during the communication session that the client and the proxy ignore, said synthetic traffic being generated by mimicking protocols commonly used over the other communication ports.

12. The system of claim 11, wherein the port assigner service is to supply a same port identifier to both the client and the proxy at any particular point during the communication session.

13. The system of claim 11, wherein the port assigner service is to multiplex a particular pair of communication ports at any particular point during the communication session so the client uses a first communication port and the server using a second communication port and the first and second communication ports are mapped to one another.

14. The system of claim 11, wherein the port assignor service is to select communications ports for use based on a pool of active ports that are already in use between the client and the proxy.

* * * * *